United States Patent
Nedunchezhian et al.

(10) Patent No.: US 9,762,489 B2
(45) Date of Patent: Sep. 12, 2017

(54) LOCAL PACKET SWITCHING AT A SATELLITE DEVICE

(71) Applicant: Cisco Technology, Inc., San Jose, CA (US)

(72) Inventors: Sureshkumar Nedunchezhian, Sunnyvale, CA (US); Yulianto Ko, Fremont, CA (US); Gajendra Shukla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 14/495,235

(22) Filed: Sep. 24, 2014

(65) Prior Publication Data

US 2016/0087893 A1 Mar. 24, 2016

(51) Int. Cl.
| | |
|---|---|
| *H04L 12/741* | (2013.01) |
| *H04B 7/185* | (2006.01) |
| *H04L 12/46* | (2006.01) |
| *H04L 12/947* | (2013.01) |
| *H04L 12/751* | (2013.01) |
| *H04L 12/721* | (2013.01) |

(52) U.S. Cl.
CPC ........... *H04L 45/745* (2013.01); *H04B 7/185* (2013.01); *H04L 12/4641* (2013.01); *H04L 45/02* (2013.01); *H04L 45/54* (2013.01); *H04L 45/66* (2013.01); *H04L 49/25* (2013.01)

(58) Field of Classification Search
None
See application file for complete search history.

(56) References Cited

U.S. PATENT DOCUMENTS

| | | | |
|---|---|---|---|
| 2012/0014386 A1* | 1/2012 | Xiong | ............... H04L 29/12028 370/392 |
| 2013/0039218 A1 | 2/2013 | Narasimhan et al. | |

(Continued)

OTHER PUBLICATIONS

Cisco, "Network Adapter Virtualization Design (Adapter-FEX) with Cisco Nexus 5500 Switches and Cisco Nexus 2232 Fabric Extenders," Design Guide, Nov. 2011, retrieved from http://www.cisco.com/c/en/us/products/collateral/switches/nexus-5000-series-switches/guide_c07-690080.html, on Sep. 24, 2014, 63 pages.

(Continued)

*Primary Examiner* — Steven H Nguyen
(74) *Attorney, Agent, or Firm* — Edell, Shapiro & Finnan, LLC (57) ABSTRACT

A data packet is received, at a parent switching device, from a first host device via a remote switching device. The data packet has a first source media access control (MAC) address corresponding to the first host device and information indicative that the data packet passed through the remote switching device via a first port. An entry is added to a parent switching table in the parent switching device, the parent switching table associating the first MAC address and the first port of the remote switching device with one another. A switching table entry update message is sent to the remote switching device indicating that the first MAC address and the first port are associated with one another so as to enable a subsequent data packet destined for the first host device and received at the remote switching device to be switched directly to the first host.

17 Claims, 6 Drawing Sheets

(56) References Cited

U.S. PATENT DOCUMENTS

| | | | |
|---|---|---|---|
| 2013/0315246 A1* | 11/2013 | Zhang .................... | H04L 12/56 370/392 |
| 2014/0241353 A1* | 8/2014 | Zhang .................... | H04L 45/74 370/390 |
| 2015/0236952 A1* | 8/2015 | Liang .................. | H04L 61/2596 370/230 |

OTHER PUBLICATIONS

International Search Report and Written Opinion in counterpart International Application No. PCT/US2015/051351, mailed Dec. 14, 2015, 12 pages.

* cited by examiner

LOCAL PACKET SWITCHING AT A SATELLITE DEVICE

TECHNICAL FIELD

The present disclosure relates to packet switching in an electronic data network comprising a parent switching device and an associated satellite or remote switching device.

BACKGROUND

Cloud computing can be defined as Internet-based computing in which shared resources, software and information are provided to client or user computers or other devices on-demand from a pool of resources that are communicatively available via the Internet, or other electronic network. Cloud computing is envisioned as a way to democratize access to resources and services, letting users efficiently purchase as many resources as they need and/or can afford.

In some possible implementations, cloud computing comprises linking backend resources (e.g., memory, processors, etc.) to provide web-based services, applications, and data storage. This approach has the effect of providing services at lower cost than other, e.g., local enterprise, options and with less complexity, greater scalability, and wider reach. However, linking the capabilities of such backend systems to each other and to client or user devices can be daunting, especially in view of the fact that there may be many thousands of such backend systems, clients and hosts, needing to be interconnected with one another.

DESCRIPTION OF EXAMPLE EMBODIMENTS

Overview

Presented herein are techniques to enable local switching at a satellite or remote switching device that is operating as a port or fabric extender of a parent switching device. A method includes receiving, at a parent switching device, via a remote switching device, a data packet from a first host device, the data packet having at least a first source media access control (MAC) address corresponding to the first host device and associated information indicative that the data packet passed through the remote switching device via a first port, adding an entry in a parent switching table stored in a memory of the parent switching device, the parent switching table being configured to associate the first MAC address and the first port of the remote switching device with one another; and sending a switching table entry update message to the remote switching device, the switching table entry update message including information indicating that the first MAC address and the first port are associated with one another so as to enable a subsequent data packet destined for the first host device and received at the remote switching device to be switched directly to the first host device without the subsequent data packet being forwarded to the parent switching device. An apparatus configured to perform the instant methodology is also disclosed.

In another embodiment a method includes at a satellite switching device, receiving a switching table entry update message from a parent switching device, the switching table entry update message including information indicating that a first MAC address and a first port of the satellite switching device are associated with one another, updating a local switching table with the information indicating that the first MAC address and the first port of the remote switching device are associated with one another, receiving, at the remote switching device, a data packet destined for the first MAC address, querying the local switching table and determining that the first MAC address is associated with the first port of the remote switching device, and forwarding the data packet received at the remote switching device directly to the first port without forwarding the data packet to the parent switching device. An apparatus configured to perform the instant methodology is also disclosed.

Example Embodiments

Figure 1:
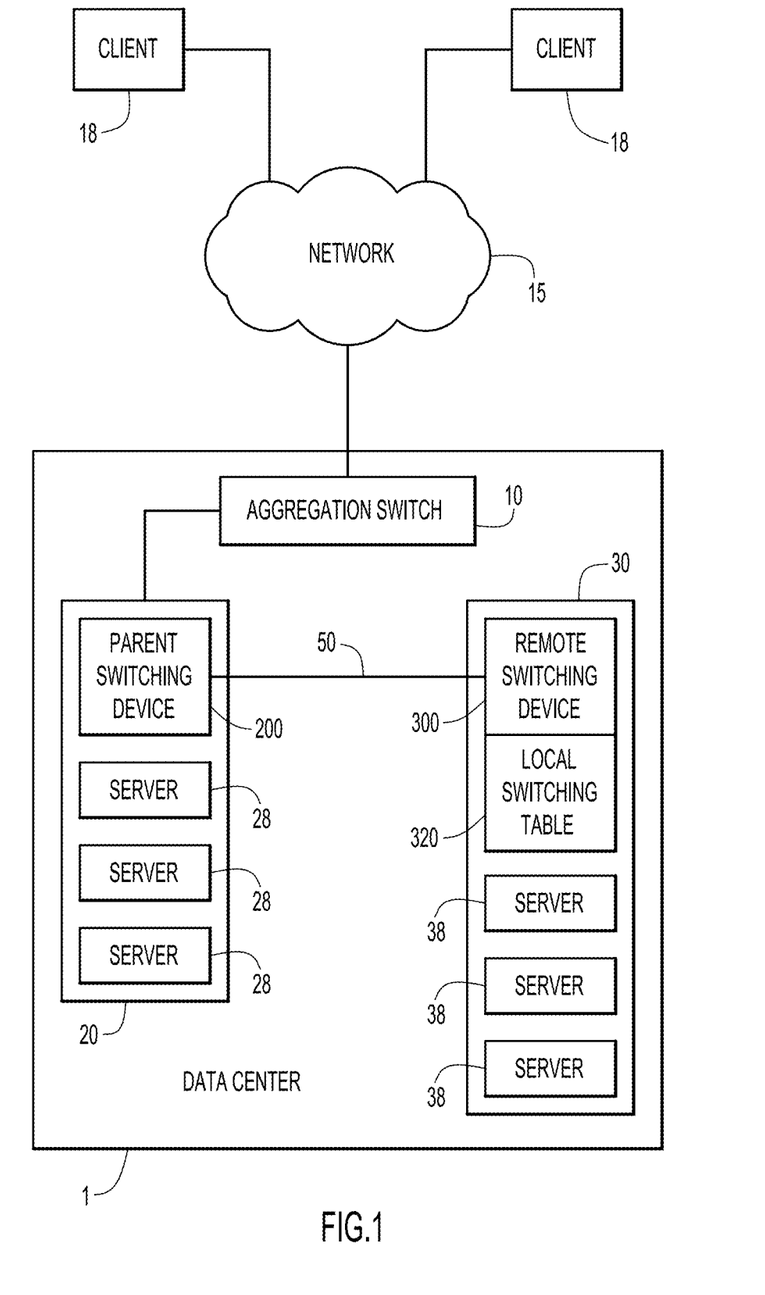
FIG. 1 is a block diagram of components including a parent switching device and a remote switching device in a data center according to an example embodiment.

FIG. 1 is a block diagram of components in a data center 1 according to an example embodiment. As shown, data center 1 includes an aggregation switch 10 that is in communication with a network 15 such as the Internet. Aggregation switch 10 could also be in communication with intermediate devices such as an edge router (not shown), among other intermediate devices, but for purposes of the instant description, aggregation switch 10 is, as noted, in communication with outside network 15. Network 15 enables individual clients 18 to communicate with data center 1. Clients 18 may be desktop or laptop computers, smart phones, tablets or any other computing device that can communicate with data center 1 via network 15.

Aggregation switch 10 is also in communication with a first server rack 20. First server rack 20 includes, for example, a Top of Rack (ToR) switch or Parent Switching Device 200 and a plurality of servers 28. Parent Switching Device 200 is in communication with a second server rack 30. Second server rack 30 includes a satellite or Remote Switching Device 300 and a plurality of servers 38, which are connected to Remote Switching Device 300.

Remote Switching Device 300 in the depicted configuration may, as noted, be referred to as a "satellite" switching device and functions, effectively, as a switching fabric or port extender of Parent Switching Device 200. More specifically, Parent Switching Device 200 includes a plurality of ports which are respectively in communication with individual servers 28. However, one or more of said ports may be in communication, instead, with Remote Switching Device 300. As a result, a given port of Parent Switching Device 200 may also be effectively in communication with each server 38 in server rack 30 via Remote Switching Device 300 and its respective ports.

As will be explained more fully below, Remote Switching Device 300 can be configured to operate, in some respects, autonomously from Parent Switching Device 200. Such autonomous operation can save bandwidth that would normally be consumed over connection 50 between Remote Switching Device 300 and Parent Switching Device 200, and can also thus improve latency for data communications that are handled via Remote Switching Device 300 by itself.

Those skilled in the art will appreciate that, while FIG. 1 and data center 1 depict only two server racks, namely first server rack 20 and second server rack 30, a typical data center might comprise hundreds or even thousands of similar server racks. For purposes of the instant description, however, the two depicted server racks are sufficient.

Figure 2:
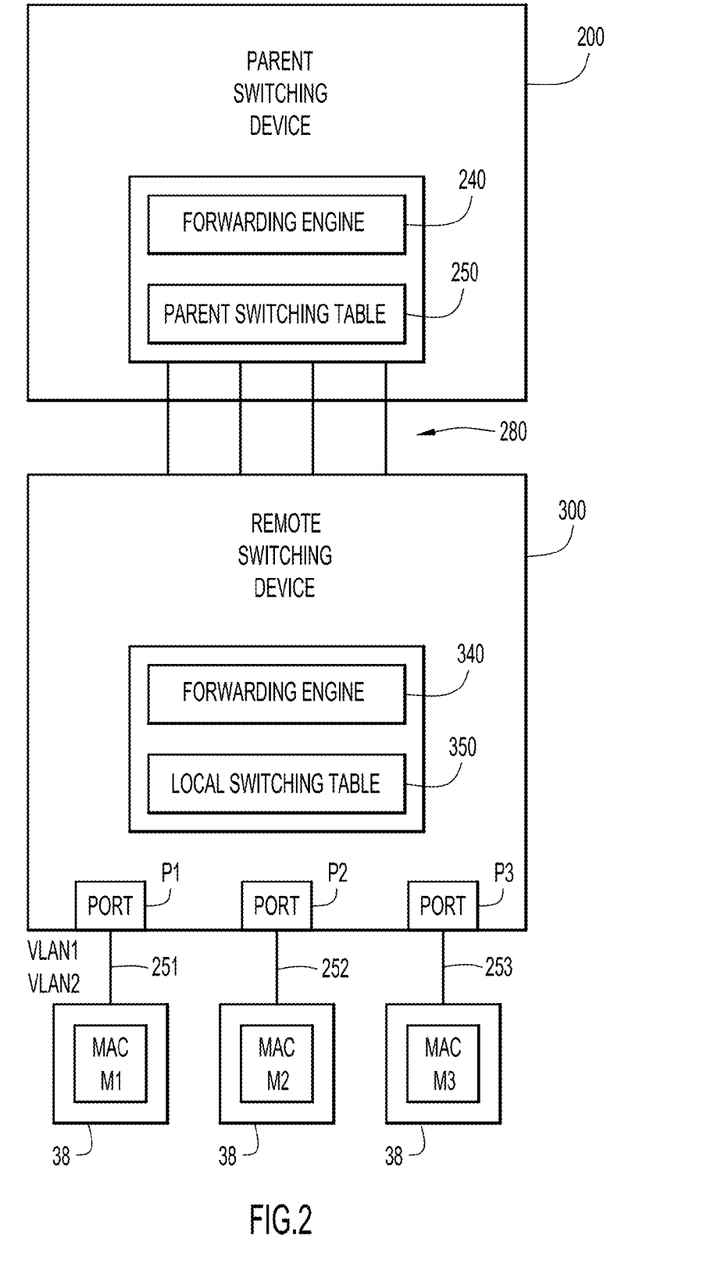
FIG. 2 is a more detailed block diagram of a parent switching device, a remote switching device and connected host devices according to an example embodiment.

FIG. 2 is a more detailed block diagram of Parent Switching Device 200, Remote Switching Device 300 and connected host devices 38 according to an example embodiment. The drawing depicts Parent Switching Device 200, Remote Switching Device 300 and servers 38 connected to each other in a hierarchical topology. Servers 28 (which are in direct communication with Parent Switching Device 200) are not depicted as they are not particularly relevant to the following description. As noted, Parent Switching Device 200 could be a ToR switch as depicted in FIG. 1 or could be another switch. Parent Switching Device 200 includes a Forwarding Engine 240 and a Parent Switching Table 250. Remote Switching Device 300 comprises a Forwarding Agent 340 and a Local Switching Table 350. Three host devices or servers 38 are connected to respective ports P1, P2 and P3 of Remote Switching Device 300.

Each of the host devices or servers 38 has an assigned media access control (MAC) address M1, M2 and M3, respectively. The MAC addresses may be hard coded or may be configurable. A network interface card may be employed to achieve the indicated connectivity between a given server and Remote Switching Device 300. (Parent Switching Device 200 may also comprise network interface cards.) Each MAC address may support multiple virtual local area networks (VLANs) depicted or designated as, e.g., VLAN1, VLAN2, etc. That is, servers 38 may support multiple virtual LANs whose communications are designated through the use of VLAN tags in, e.g., Ethernet packet headers. As further shown, each server 38 is in communication with Remote Switching Device 300 via a connection 251, 252 or 253. Such connections may be implemented with, e.g., Ethernet cables.

Forwarding Engine 240 and Parent Switching Table 250 are responsible for "learning" via which port a given MAC address and VLAN is communicating and, thereafter, for forwarding data communications destined for that given MAC address and VLAN to the learned port. More specifically, assume communication from MAC address M1 over VLAN VLAN1 is destined for MAC address M2. The communication is first received at port P1 of Remote Switching Device 300. Then, in accordance with an embodiment, that communication is then passed directly to Parent Switching Device 300 for forwarding to the appropriate destination port and thus toward the desired MAC address/VLAN. Upon receiving the communication, Forwarding Engine 240 "learns" that port P1 is associated with MAC address M1 and VLAN VLAN1 and adds an entry in Parent Switching Table 250 accordingly. That is, Parent Switching Table 240 is updated to include an entry of the tuple: MAC address, VLAN, port number. As a result, if a subsequent communication, i.e., a data packet, is received and is destined for that MAC address/VLAN pair, parent Switching Device 200, using Forwarding Engine 240 and Parent Switching Table 250, can forward the received communication toward port P1 on Remote Switching Device 300.

The foregoing scenario assumes that all communication received via a port on Remote Switching Device 300 is passed to Parent Switching device 200 for appropriate table update, look up and forwarding operations. In accordance with embodiments described herein, however, Remote Switching device 300 is configured such that communications received on one of its ports that is destined for a given MAC address/VLAN pair that is serviced by another port of Remote Switching Device 300 is immediately forwarded to that port on Remote Switching Device 300 without the communication being passed to Parent Switching Device 200.

To effect this autonomous forwarding operation of Remote Switching Device 300, in an embodiment, Parent Switching Device 200 is configured to supply Remote Switching Device 300 with forwarding information sufficient to enable Remote Switching Device 300 to forward data communications, i.e., packets, between servers 38 that are connected to ports on Remote Switching Device 300, thus avoiding the operation of passing the communication to Parent Switching Device 200 and causing resulting bandwidth usage over connections 280, and thus avoiding latency associated with the extra distance.

In many cases, when a server first comes on line, that server will send an Address Resolution Protocol (ARP) message or subsequent periodic Gratuitous ARP (GARP) message indicating that server's (and associated MAC address's) presence. In accordance with an embodiment, any such ARP or GARP message, if received at Remote Switching Device 300, is automatically and immediately passed to Parent Switching Device 200. In this way, Parent Switching Table 250 in Parent Switching Device 200 can be updated appropriately by adding an entry therein that associates the MAC address, VLAN and port number tuple for that ARP/GARP packet.

Upon adding such an entry to Parent Switching Table 250, Forwarding Engine 240 is configured to send a "switching table entry update message" to Remote Switching Device 300 that includes the MAC address, VLAN and port number tuple for the learned port such that Local Switching Table 350 can be updated with the same information. That is, Local Switching Table 350 is configured to be synchronized with Parent Switching Table 250 with respect to MAC addresses and VLANs that are supported via ports on Remote Switching Device 300.

In the just described scenario, MAC address M1 and VLAN VLAN1 are associated with port P1. As explained, that tuple information is arranged to be resident in Local Switching Table 350. As a result, when, e.g., a communication from MAC address M3 and destined for MAC address M1 and VLAN VLAN 1 is received at port P3, Forwarding Agent 340 in Remote Switching Device 300 first consults Local Switching Table 350 to determine if the MAC address M1 and VLAN1 are listed therein. If so (and under the instant scenario, it is so), Forwarding Agent 340 is able to autonomously (i.e., without the further assistance of Parent Switching Device 200) forward the received communication (data packet) directly to port P1.

In the event a destination MAC address/VLAN pair is not found in Local Switching Table 350, the packet is simply passed to Parent Switching Device 200 so that Parent Switching Table 250 can be appropriately updated (whereupon that update will be passed to Local Switching Table 350 via a switching table entry update message from Parent Switching Device 200).

In one embodiment, Parent Switching Table 250 is implemented as a static table manager (STM) and Local Switching Table 350 is implemented as ternary content-addressable memory (TCAM). One advantage of a TCAM implementation is the relatively fast speed with which data search or queries can be made and results returned.

The foregoing explanation described how table entries in Parent Switching Table 250 are provided to Local Switching Table 350. In order to maintain synchronization between Parent Switching Table 250 and Local Switching Table 350, table entries removed from Parent Switching Table 250 should likewise be removed from Local Switching Table 350. Thus, in an embodiment, a switching table entry update message indicating that a given table entry should be removed from Local Switching Table 350 can be sent by Parent Switching Device 200 when appropriate.

It is noted that removal of a table entry can be triggered as a result of a given entry having aged out. For example, if Parent Switching Device 200 has not detected a communication (i.e., a packet) for a given MAC address/VLAN combination over a predetermined amount of time (e.g., 30 seconds, 5 minutes, 30 minutes, etc.) this may mean that the MAC address/VLAN combination is no longer operable, and thus there is no need to maintain the entry in the table. When a table entry is to be removed from Parent Switching Table 250 that same entry is also removed from Local Switching Table 350 by sending a switching table entry update message indicating a removal action. In this way, the two tables remain synchronized, with Parent Switching Table 250 effectively acting as the master table.

In another scenario, a MAC address might move from one port to another on a same remote switching device, or to anther remote switching device altogether. When such a move occurs, the server (MAC address) that has moved will eventually send an ARP message or GARP message resulting in an update to Parent Switching Table 250 (and thus resulting in a corresponding update to Local Switching Table 350). Autonomous local packet forwarding by Remote Switching Device 300 can thereafter be performed.

Figure 3A:
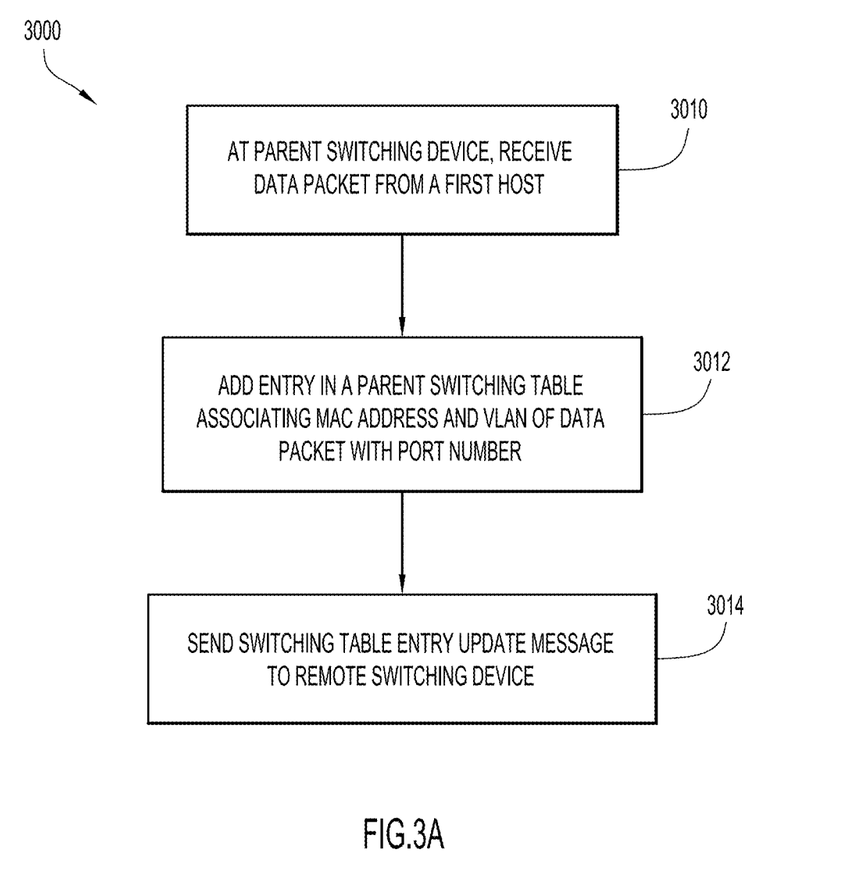
FIGS. 3A and 3B are example flow charts depicting a series of operations for implementing an example embodiment.

FIG. 3A is an example flow chart 3000 depicting a series of operations for implementing an example embodiment. At 3010, at a parent switching device, a packet is received from a first host. At 3012, an entry in a parent switching table is added associating a MAC address, VLAN and port number (although a VLAN value is not essential). At 3014, a switching tale update message is sent to the remote switching device. The foregoing operations are generally performed by the parent switching device that has connected thereto a remote or satellite switching device.

Figure 3B:
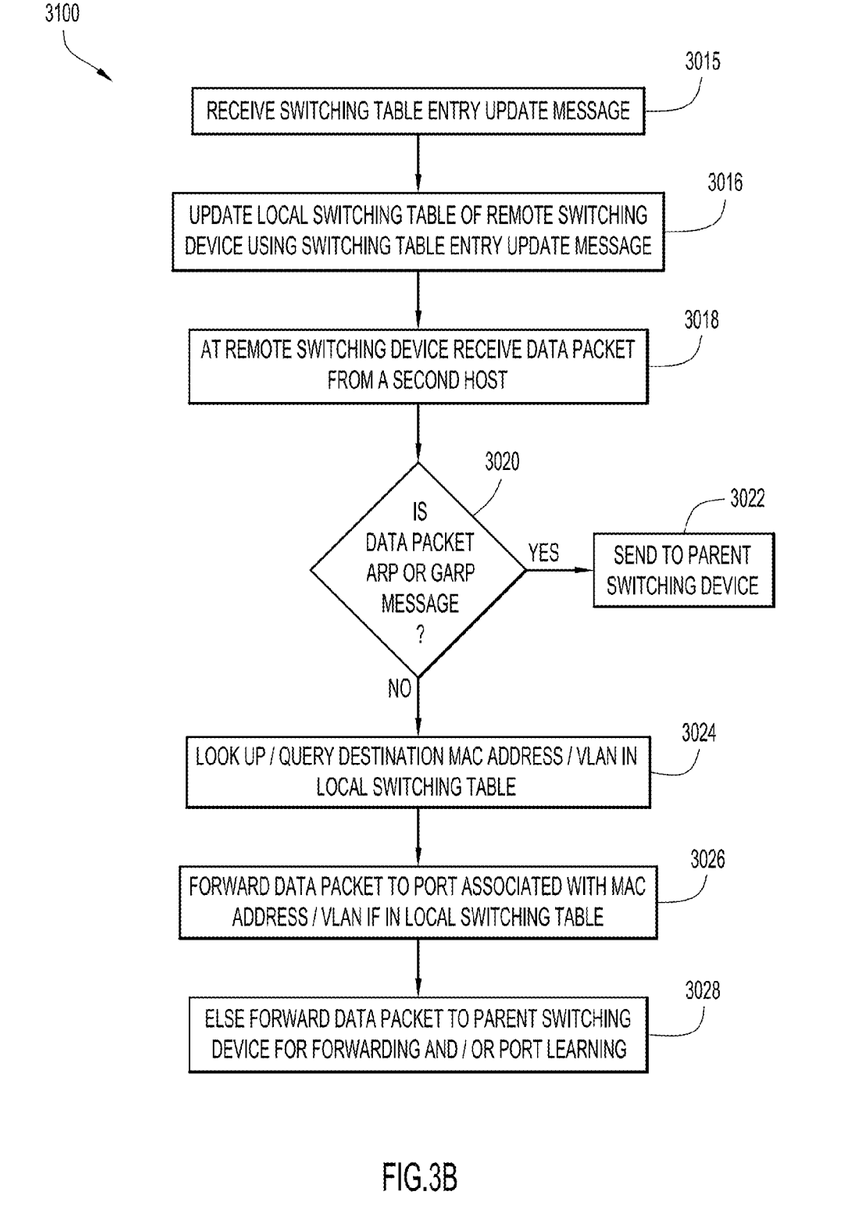

FIG. 3B is an example flow chart 3100 depicting a series of operations for implementing an example embodiment. At 3015, the switching table entry update message sent at 3014 is received at the remote switching device. At 3016 a local switching table of the remote switching device is updated with a similar table entry as was added to the parent switching device in operation 3012, e.g., a MAC address, VLAN, Port number tuple. At 3018, a data packet is received at the remote switching device from a second host, the packet having a destination MAC address and VLAN designation.

At 3020 it is determined whether the data packet is or is part of an ARP or GARP message. If so, then at 3022, that data packet is immediately sent to the parent switching device. If the data packet is not or is not part of an ARP or GARP message, operation 3024 is performed. At 3024, the MAC address and VLAN designation are looked up in the local switching table to identify a destination port number for the packet. If the MAC address and VLAN are found in the local switching table, then a port number can be identified for purposes of forwarding the packet. As such, at 3026, the packet is forwarded to the identified port in the remote switching device, without the packet having to be passed to the parent switching device. At 3028, if the MAC address and VLAN are not found in the local switching table, then the packet is forwarded to the parent switching device for forwarding and/or port learning.

In accordance with an embodiment, the switching table entry update messages described above and via which Local Switching Table 350 is updated, may be communicated from Parent Switching Device 200 to Remote Switching device 300 using a control plane that may be in-band or out of band. The control plane may be centralized or distributed. The control plane may be realized via connections 280 shown in FIG. 2.

In a possible implementation, Parent Switching Device 200 may have 32-64 ports. Remote Switching Device 300 may have on the order of 64 ports. Those skilled in the art will appreciate therefore that a remote switching device can significantly extend the switching capabilities of a parent switching device. By implementing the techniques described herein, it is possible to reduce bandwidth usage over links 280 between the parent switching device the port/fabric extender remote switching device. Latency that might otherwise occur as a result of additional travel to and from a parent switching device is likewise reduced.

Figure 4:
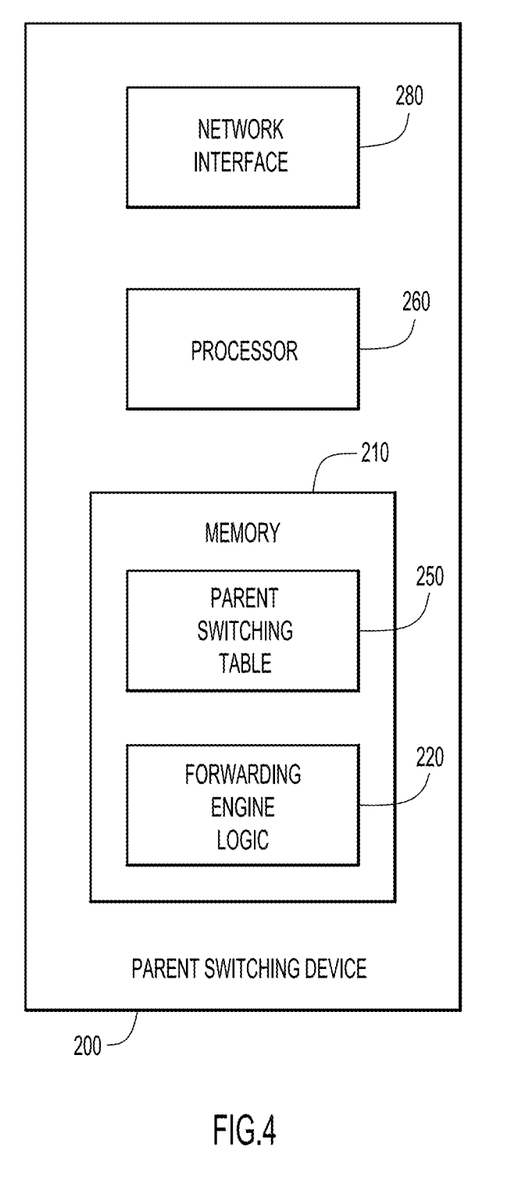
FIG. 4 is a block diagram of a parent switching device according to an example embodiment.

FIG. 4 is a block diagram of Parent Switching Device 200 according to an example embodiment. Parent Switching Device 200 includes a processor 260, memory 210 to store a variety of data and software instructions including Forwarding Engine Logic 220 (e.g., for the operations of FIG. 3A). Memory 210 also stores Parent Switching Table 250. Parent Switching Device 200 also includes a network interface unit 280, e.g., one or more ports or network interface cards via which Parent Switching Device 200 can communicate with a network and/or other switching devices.

Memory 210 may comprise read only memory (ROM), random access memory (RAM), magnetic disk storage media devices, optical storage media devices, flash memory devices, electrical, optical, or other physical/tangible (e.g., non-transitory) memory storage devices. Processor 260 may be, for example, a microprocessor or microcontroller that executes instructions for implementing the processes described herein. Thus, in general, memory 210 may comprise one or more tangible (non-transitory) computer readable storage media (e.g., a memory device) encoded with software comprising computer executable instructions and when the software is executed (by processor 260) it is operable to perform the operations described herein.

Figure 5:
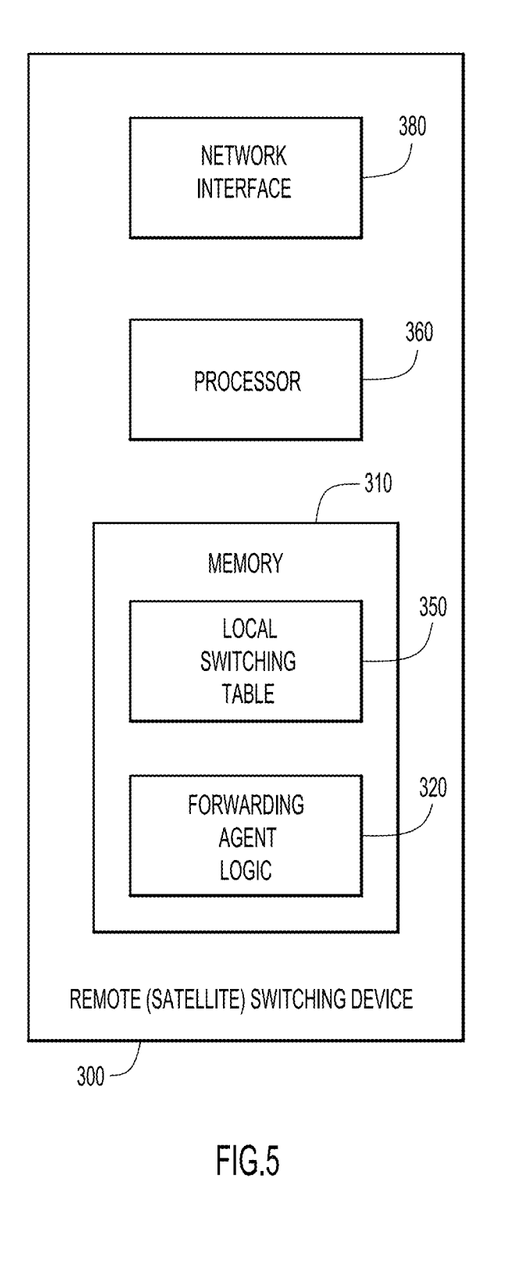
FIG. 5 is a block diagram of a satellite or remote switching device according to an example embodiment.

FIG. 5 is a block diagram of Remote Switching Device 300 according to an example embodiment. Remote Switching Device 300 includes a processor 360, memory 310 to store a variety of data and software instructions including Forwarding Agent Logic 220 (e.g., for the operations of FIG. 3B). Memory 310 also stores Local Switching Table 350. Remote Switching Device 300 also includes a network interface unit 380, e.g., one or more ports via which Remote Switching Device 300 can communicate with Parent Switching Device 200 and other devices.

Memory 310 may comprise read only memory (ROM), random access memory (RAM), magnetic disk storage media devices, optical storage media devices, flash memory devices, electrical, optical, or other physical/tangible (e.g., non-transitory) memory storage devices. Processor 360 may be, for example, a microprocessor or microcontroller that executes instructions for implementing the processes described herein. Thus, in general, memory 310 may comprise one or more tangible (non-transitory) computer readable storage media (e.g., a memory device) encoded with software comprising computer executable instructions and when the software is executed (by processor 260) it is operable to perform the operations described herein.

As noted, in a network environment comprising a parent network device and a satellite or remote network (i.e., a fabric extender) device with limited control plane capability, data traffic from a host device connected to the satellite device destined to another host device connected to the same satellite device is switched through the parent device irrespective of the destination being in the same satellite device. This additional hop introduces latency, which is not negligible in certain low latency desired environments. The cost to maintain a MAC address table and implementing MAC address learning in the satellite device similar to those functions in the parent device to switch frames or packets between end hosts can be prohibitively high. Additionally, the uplink bandwidth from the satellite to the parent switch is often limited and could be a congestion point in the network. However, the inclusion of substantially autonomous local switching by the satellite device in accordance with the embodiments described herein can help to reduce the burden on the uplink bandwidth usage.

That is, in accordance with the embodiments described herein there is provided a system that implements local switching in satellite devices with limited control plane capabilities. The parent device upon learning a MAC address/port pairing on the satellite device, dynamically sends a request message to the forwarding agent in the satellite device to program or update a TCAM that matches the destination MAC address and VLAN and redirects the traffic to the destination port on which the MAC was learned. As a result, any further data traffic (that is also part of the designated VLAN), destined to this learned MAC address will be redirected to the port that is programmed, without the necessity to reach the parent switch for switching.

As will be appreciated by those skilled in the art, the instant implementation is distributed in nature where the satellite device need not have MAC learning capability and, instead, relies on the parent switch for programming the TCAM. When the parent switch detects MAC aging out, the parent switch sends a request message to the satellite device to remove the access control from TCAM. Synchronization between the parent switch and the satellite switch is achieved by relying on the fact that end hosts send periodic GARP messages and the satellite device is configured to let any such GARP (or ARP) traffic immediately reach the parent switch. This enables the parent switch to refresh its MAC address table and avoids MAC aging out. Generally, since it is recommended that the GARP announcement is made before a MAC age out timer expires, the system will not prematurely age out the MAC in common scenarios.

When the parent switch detects a MAC move, the parent switch can send a request message to the satellite device to update the destination port.

Thus, the described embodiments achieve switching in satellite devices, even when such satellite devices may be constrained by no source (i.e., port) learning. The approach of relying on the parent switch to update a switching table in the satellite or remote device enables the overall system to achieve efficient switching without having to add full MAC source learning to the satellite switch. Further, unlike approaches like policy based routing, which might also use a TCAM implementation to route traffic, the embodiments described herein are dynamic in nature and perform switching without relying on a user to configure forwarding or routing tables statically.

In summary, a method is provided comprising: receiving, at a parent switching device, via a remote switching device, a data packet from a first host device, the data packet having at least a first source media access control (MAC) address corresponding to the first host device and associated information indicative that the data packet passed through the remote switching device via a first port; adding an entry in a parent switching table stored in a memory of the parent switching device, the parent switching table being configured to associate the first MAC address and the first port of the remote switching device with one another; and sending a switching table entry update message to the remote switching device, the switching table entry update message including information indicating that the first MAC address and the first port are associated with one another so as to enable a subsequent data packet destined for the first host device and received at the remote switching device to be switched directly to the first host device without the subsequent data packet being forwarded to the parent switching device.

Similarly, an apparatus is provided comprising: a network interface unit configured to enable communications via a network; a memory to store logic instructions; and a processor, when executing the logic instructions, configured to: receive via a remote switching device, a data packet from a first host device, the data packet having at least a first source media access control (MAC) address corresponding to the first host device and associated information indicative that the data packet passed through the remote switching device via a first port; add an entry in a parent switching table stored in the memory, the parent switching table being configured to associate the first MAC address and the first port of the remote switching device with one another; and send a switching table entry update message to the remote switching device, the switching table entry update message including information indicating that the first MAC address and the first port are associated with one another so as to enable a subsequent data packet traffic destined for the first host device and received at the remote switching device to be switched directly to the first host device without the subsequent data packet being forwarded to the network interface unit.

In another form, a method is provided comprising: A method comprising: at a satellite switching device, receiving a switching table entry update message from a parent switching device, the switching table entry update message including information indicating that a first MAC address and a first port of the satellite switching device are associated with one another; updating a local switching table with the information indicating that the first MAC address and the first port of the remote switching device are associated with one another; receiving, at the remote switching device, a data packet destined for the first MAC address; querying the local switching table and determining that the first MAC address is associated with the first port of the remote switching device; and forwarding the data packet received at the remote switching device directly to the first port without forwarding the data packet to the parent switching device.

The above description is intended by way of example only. Various modifications and structural changes may be made therein without departing from the scope of the concepts described herein and within the scope and range of equivalents of the claims.

What is claimed is:

1. A method comprising:
   receiving, at a parent switching device, via a remote switching device, a data packet from a first host device, the data packet having at least a first source media access control (MAC) address corresponding to the first host device and associated information indicative that the data packet passed through the remote switching device via a first port;

adding an entry in a parent switching table stored in a memory of the parent switching device, the parent switching table being configured to associate the first MAC address and the first port of the remote switching device with one another; and sending a switching table entry update message to the remote switching device, the switching table entry update message including information indicating that the first MAC address and the first port are associated with one another so as to enable a subsequent data packet destined for the first host device and received at the remote switching device to be switched directly to the first host device without the subsequent data packet being forwarded to the parent switching device, wherein receiving a data packet from the first host device comprises receiving a data packet consistent with an Address Resolution Protocol (ARP) message or a Gratuitous ARP (GARP) message without the remote switching device performing a query in a local switching table stored in the remote switching device, wherein the local switching table is comprised of ternary content-addressable memory (TCAM), and wherein the parent switching device is in communication with an aggregation switch, and the remote switching device is also in communication with the aggregation switch, but only via the parent switching device.

2. The method of claim 1, further comprising detecting a virtual local area network (VLAN) designation in the data packet and updating the parent switching table with the VLAN designation.

3. The method of claim 1, wherein sending a switching table entry update message to the remote switching device comprises sending the switching table entry update message to the remote switching device via a control plane.

4. The method of claim 3, wherein sending the switching table entry update message to the remote switching device is performed in-band.

5. The method of claim 1, further comprising determining that the entry in the parent switching table has aged out and, in response, sending another switching table entry update message to the remote switching device configured to remove a corresponding entry in a switching table of the remote switching device.

6. The method of claim 1, further comprising detecting a MAC move event and, in response, sending another switching table entry update message to the remote switching device configured to modify a corresponding entry in a switching table of the remote switching device.

7. An apparatus comprising:
a network interface unit configured to enable communications via a network;
a memory configured to store logic instructions; and
a processor, when executing the logic instructions, configured to:
  receive via a remote switching device, a data packet from a first host device, the data packet having at least a first source media access control (MAC) address corresponding to the first host device and associated information indicative that the data packet passed through the remote switching device via a first port;
  add an entry in a parent switching table stored in the memory, the parent switching table being configured to associate the first MAC address and the first port of the remote switching device with one another; and
  send a switching table entry update message to the remote switching device, the switching table entry update message including information indicating that the first MAC address and the first port are associated with one another so as to enable a subsequent data packet traffic destined for the first host device and received at the remote switching device to be switched directly to the first host device without the subsequent data packet being forwarded to the network interface unit, wherein the processor, when executing the logic instructions, is further configured to receive a data packet from the first host device consistent with an Address Resolution Protocol (ARP) message or a Gratuitous ARP (GARP) message without the remote switching device performing a query in a local switching table stored in the remote switching device, wherein the local switching table is comprised of ternary content-addressable memory (TCAM), and wherein the apparatus is in communication with an aggregation switch, and the remote switching device is also in communication with the aggregation switch, but only via the apparatus.

8. The apparatus of claim 7, wherein the processor, when executing the logic instructions, is further configured to:
detect a virtual local area network (VLAN) designation in the data packet and update the parent switching table with the VLAN designation.

9. The apparatus of claim 7, wherein the processor, when executing the logic instructions, is further configured to:
send the switching table entry update message to the remote switching device via a control plane.

10. The apparatus of claim 7, wherein the processor, when executing the logic instructions, is further configured to:
determine that the entry in the parent switching table has aged out and, in response, send another switching table entry update message to the remote switching device configured to remove a corresponding entry in a switching table of the remote switching device.

11. The apparatus of claim 7, wherein the processor, when executing the logic instructions, is further configured to:
detect a MAC move event and, in response, send another switching table entry update message to the remote switching device configured to modify a corresponding entry in a switching table of the remote switching device.

12. A method comprising:
at a satellite switching device, receiving a switching table entry update message from a parent switching device, the switching table entry update message including information indicating that a first MAC address and a first port of the satellite switching device are associated with one another;
updating a local switching table with the information indicating that the first MAC address and the first port of the satellite switching device are associated with one another wherein the local switching table is comprised of ternary content-addressable memory (TCAM);
receiving, at the satellite switching device, a data packet destined for the first MAC address;
querying the local switching table and determining that the first MAC address is associated with the first port of the satellite switching device;
forwarding the data packet received at the satellite switching device directly to the first port without forwarding the data packet to the parent switching device; and
receiving an Address Resolution Protocol (ARP) message or a Gratuitous ARP (GARP) message and forwarding the ARP or GARP message to the parent switching device without querying the local switching table, wherein the parent switching device is in communication with an aggregation switch, and the satellite switching device is also in communication with the aggregation switch, but only via the parent switching device.

13. The method of claim 12, wherein receiving a switching table entry update message from a parent switching device comprises receiving the switching table entry update message via a control plane.

14. The method of claim 12, wherein receiving the switching table entry update message from the parent switching device is performed in-band.

15. The method of claim 12, further comprising detecting a virtual local area network (VLAN) designation in the data packet and using the VLAN designation in querying the local switching table.

16. The method of claim 12, further comprising receiving another switching table entry update message configured to remove a corresponding entry in the local switching table.

17. The method of claim 12, receiving another switching table entry update message configured to modify an entry in the local switching table.

* * * * *